US012654451B2

(12) United States Patent
Kubo et al.

(10) Patent No.: US 12,654,451 B2
(45) Date of Patent: Jun. 16, 2026

(54) HEAD MAINTENANCE DEVICE AND LIQUID DISCHARGE APPARATUS

(71) Applicants: Isamu Kubo, Kanagawa (JP); Muneyuki Okeguchi, Kanagawa (JP)

(72) Inventors: Isamu Kubo, Kanagawa (JP); Muneyuki Okeguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 174 days.

(21) Appl. No.: 18/592,535

(22) Filed: Mar. 1, 2024

(65) Prior Publication Data

US 2024/0316935 A1 Sep. 26, 2024

(30) Foreign Application Priority Data

Mar. 24, 2023 (JP) ................................ 2023-048096

(51) Int. Cl.
*B41J 2/165* (2006.01)

(52) U.S. Cl.
CPC ....... *B41J 2/16547* (2013.01); *B41J 2/16538* (2013.01)

(58) Field of Classification Search
CPC ......................... B41J 2/16547; B41J 2/16538; B41J 2/16508; B41J 2/16535; B41J 2/16585
See application file for complete search history.

(56) References Cited

U.S. PATENT DOCUMENTS

2007/0263029 A1 11/2007 Watanabe et al.
2008/0204505 A1 8/2008 Kubo
2008/0218564 A1 9/2008 Kubo
2009/0122122 A1 5/2009 Kubo et al.
2010/0020128 A1* 1/2010 Kubo .................. B41J 2/16508 347/36
2010/0321426 A1 12/2010 Suzuki et al.
2013/0120496 A1* 5/2013 Nakamura ........... B41J 2/16552 347/33
2014/0098159 A1 4/2014 Miwa et al.
2017/0253044 A1* 9/2017 Ohnishi ............... B41J 2/16535
2019/0381798 A1 12/2019 Ueda et al.
2021/0162762 A1* 6/2021 Okeguchi ........... B41J 2/16535
2022/0105722 A1 4/2022 Kubo et al.
2022/0111638 A1 4/2022 Tachibana et al.
2022/0339939 A1* 10/2022 Zollner ................ B41J 2/16511
2022/0379617 A1* 12/2022 Hayashi ............... B41J 2/16538
2023/0278338 A1 9/2023 Kubo et al.

FOREIGN PATENT DOCUMENTS

JP 2005254636 A * 9/2005
JP 2022-140297 A 9/2022

OTHER PUBLICATIONS

Extended European Search Report issued Jul. 31, 2024 in European Patent Application No. 24162252.1, 6 pages.

* cited by examiner

*Primary Examiner* — Sharon Polk
(74) *Attorney, Agent, or Firm* — XSENSUS LLP

(57) ABSTRACT

A head maintenance device includes a housing, a wiper, and a cap. The housing is detachably attachable to a conveyor of a liquid discharge apparatus. The conveyor conveys a medium in one direction. The wiper is disposed in the housing to wipe a nozzle face of a liquid discharge head of the liquid discharge apparatus. The cap is disposed in the housing to cover nozzles arrayed on the nozzle face of the liquid discharge head in the one direction.

20 Claims, 8 Drawing Sheets

HEAD MAINTENANCE DEVICE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-048096, filed on Mar. 24, 2023, in the Japan Patent Office, the entire disclosure of which is hereby incorporated by reference herein.

BACKGROUND

Technical Field

Embodiments of the present disclosure relate to a head maintenance device and a liquid discharge apparatus.

Related Art

In the related art, a liquid discharge apparatus includes a liquid discharge head having a nozzle face on which a nozzle is disposed, a cap to cover and moisturize the nozzle face, and a wiper to wipe the nozzle face, to recover the state of the nozzle of the liquid discharge head.

SUMMARY

Embodiments of the present disclosure describe an improved head maintenance device that includes a housing, a wiper, and a cap. The housing is detachably attachable to a conveyor of a liquid discharge apparatus. The conveyor conveys a medium in one direction. The wiper is disposed in the housing to wipe a nozzle face of a liquid discharge head of the liquid discharge apparatus. The cap is disposed in the housing to cover nozzles arrayed on the nozzle face of the liquid discharge head in the one direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
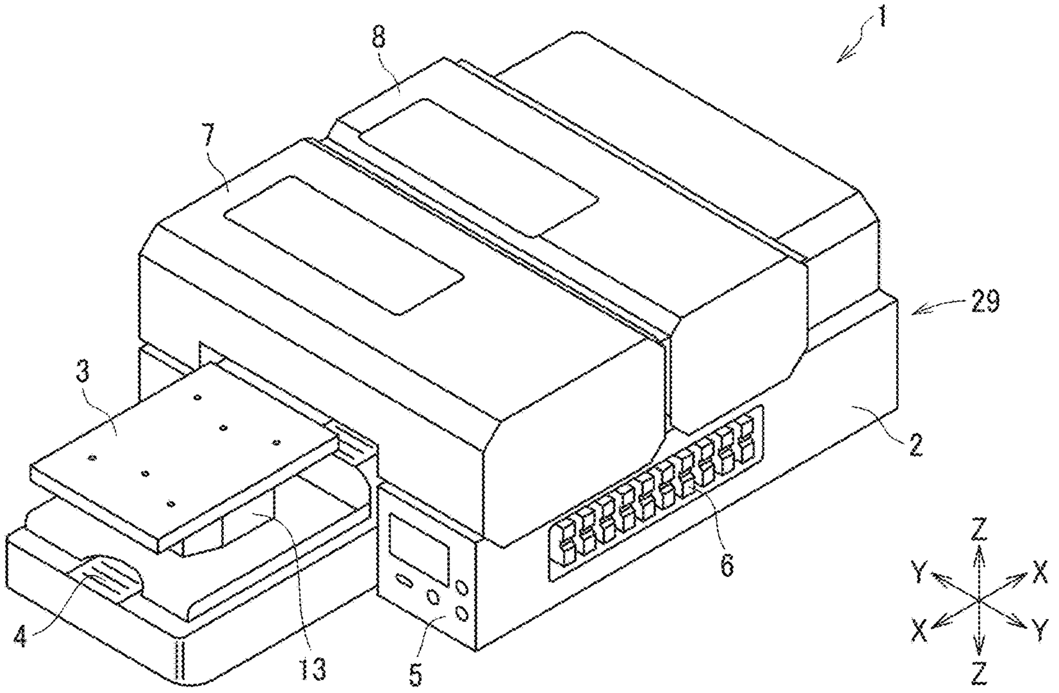
FIG. 1 is a schematic perspective view of a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the drawings, like reference signs denote like elements, and overlapping description may be simplified or omitted as appropriate. In the following description, a liquid discharge apparatus according to an embodiment of the present disclosure discharges a liquid onto a cloth as a recording medium.

Figure 2:
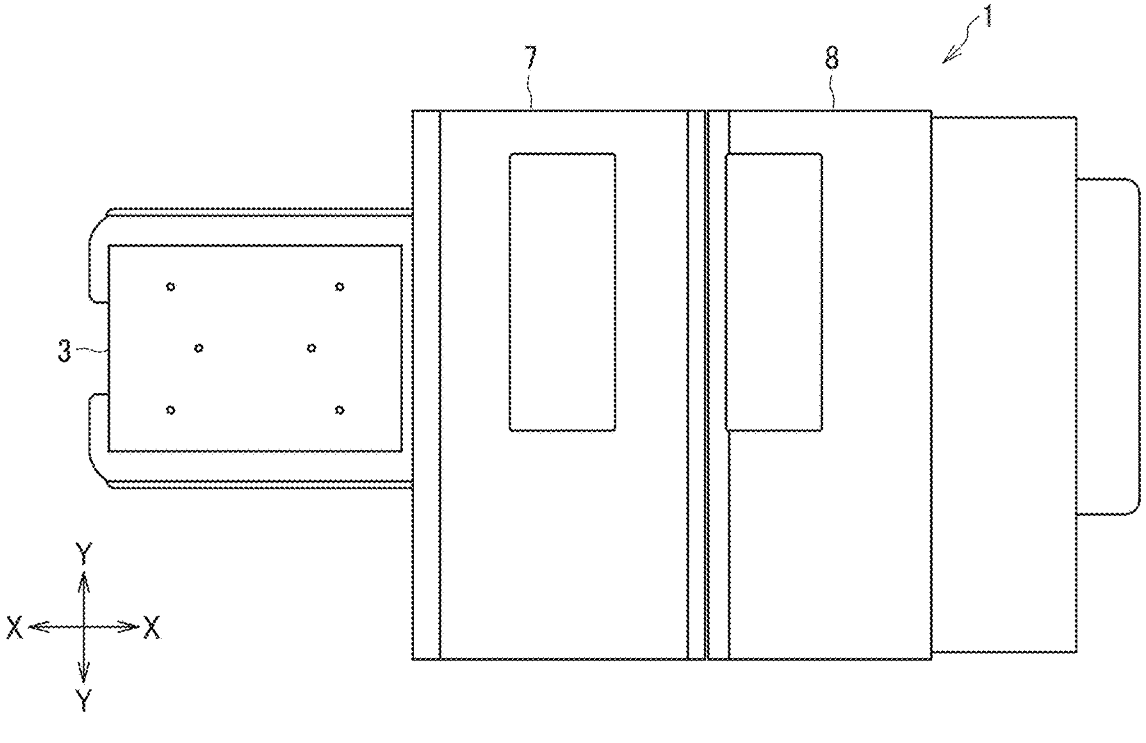
FIG. 2 is a plan view of the liquid discharge apparatus of FIG. 1.
Figure 3:
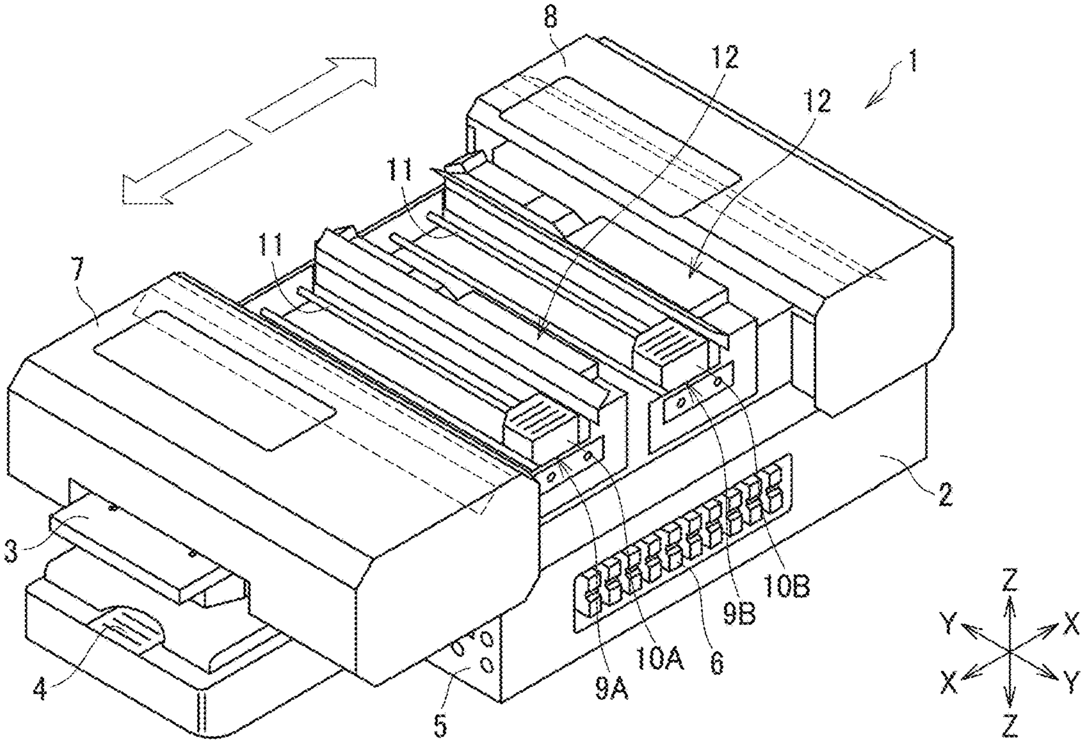
FIG. 3 is a perspective view of the liquid discharge apparatus of FIG. 1 with covers open.
Figure 4:
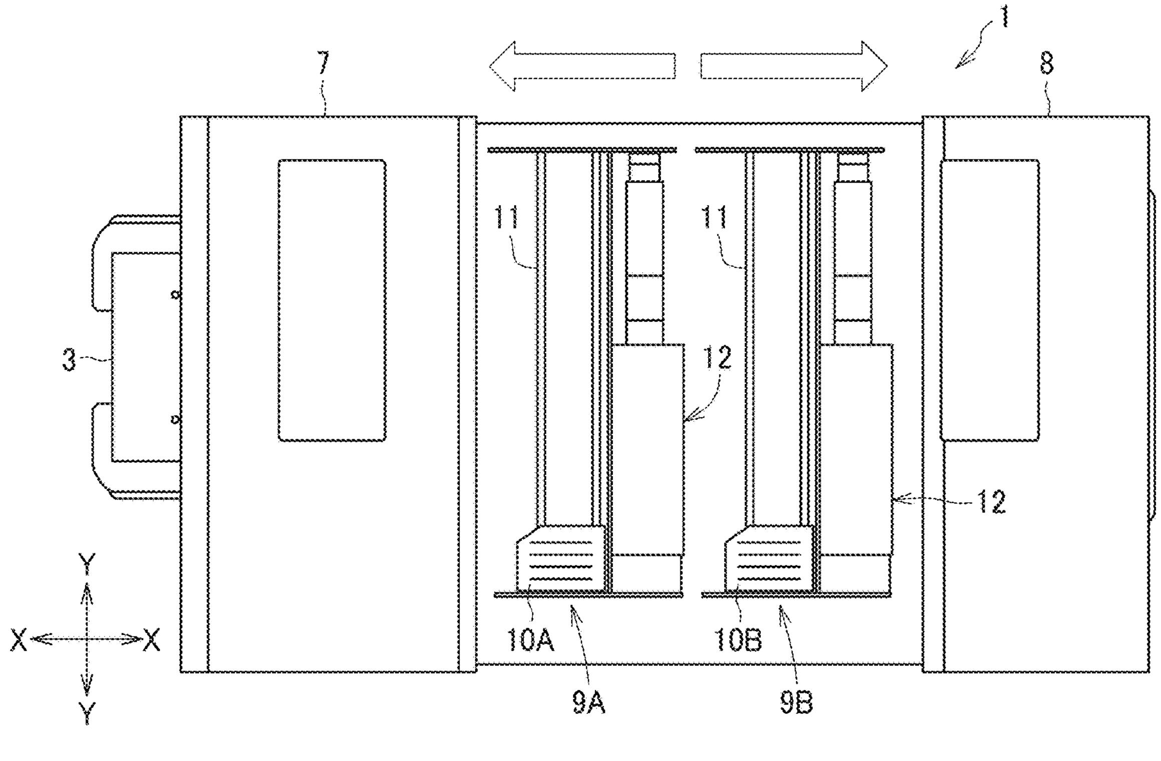
FIG. 4 is a plan view of the liquid discharge apparatus of FIG. 3.

FIG. 1 is a perspective view of a liquid discharge apparatus 1 according to an embodiment of the present disclosure, with covers closed, and FIG. 2 is a plan view thereof. FIG. 3 is a perspective view of the liquid discharge apparatus 1 with the covers open, and FIG. 4 is a plan view thereof. X directions in FIG. 1 are the front-rear direction, sub-scanning direction, and recording-medium conveyance direction of the liquid discharge apparatus 1 (i.e., one direction). Y directions in FIG. 1 are the lateral direction and main scanning direction of the liquid discharge apparatus 1 (i.e., another direction intersecting the one direction). Z directions in FIG. 1 are the vertical directions of the liquid discharge apparatus 1. The X directions and the Y directions are parallel to a surface, onto which a liquid is discharged, of a recording medium on a platen 3, but may have some error. The X, Y, and Z directions are orthogonal to each other.

As illustrated in FIGS. 1 and 2, the liquid discharge apparatus 1 includes the platen 3 in front of a housing 2. The platen 3 is attached onto a stage 13 mounted on a guide rail 4. The platen 3 is detachably attachable to the stage 13. The stage 13 is a conveyor that conveys the recording medium to a liquid discharge position of the liquid discharge apparatus 1 via the platen 3. The guide rail 4 extends in the X directions. A control panel 5 is disposed on the front face of the housing 2. An ink cartridge 6 is detachably attached to a side face of the housing 2. A front cover 7 and a rear cover 8 as covers are disposed over the housing 2.

The platen 3 has a flat upper face on which the recording medium is placed. The upper face of the platen 3 is parallel to the X directions and the Y directions. The platen 3 moves on the guide rail 4 to reciprocate in both the X directions. The platen 3 is movable up and down in the Z directions. Thus, the height of the recording medium placed on the platen 3 is adjustable.

The front cover 7 and the rear cover 8 are movable in both the X directions. In FIG. 1, the front cover 7 has been moved backward and the rear cover 8 has been moved forward to close the front cover 7 and the rear cover 8 (i.e., a closed position). On the other hand, in FIG. 3, the front cover 7 is moved forward and the rear cover 8 is moved backward to open the front cover 7 and the rear cover 8 (i.e., an open position). As described above, the front cover 7 and the rear cover 8 are slidably opened and closed. As a result, an occupied space of the liquid discharge apparatus 1 including an opening and closing space of each of the front cover 7 and the rear cover 8 can be reduced as compared with a configuration in which a front cover and a rear cover are opened and closed in the vertical direction. The front cover 7 and the rear cover 8 have openings at both ends in the front-rear direction. When the front cover 7 and the rear cover 8 are closed, the front cover 7 and the rear cover 8 are continuously arranged in the front-rear direction.

As illustrated in FIGS. 3 and 4, an apparatus body 29 of the liquid discharge apparatus 1 includes, for example, the housing 2 and liquid discharge units 9A and 9B mounted on the housing 2. In the present embodiment, specifically, the apparatus body 29 is a portion of the liquid discharge apparatus 1 other than the front cover 7 and the rear cover 8. The front cover 7 and the rear cover 8 are slidable in the X directions relative to the apparatus body 29.

The front cover 7 and the rear cover 8 are opened to expose the liquid discharge units 9A and 9B to the outside of the liquid discharge apparatus 1. When the liquid discharge units 9A and 9B are exposed to the outside, an operator can clean a liquid discharge head and the surrounding thereof, or can replace a carriage. The front cover 7 and the rear cover 8 are closed during image formation. As a result, the liquid discharge units 9A and 9B are covered by the front cover 7 and the rear cover 8 to block access to operation units such as carriages of the liquid discharge units 9A and 9B from the outside. The liquid discharge units 9A and 9B are disposed in the closed space in the front cover 7 or the rear cover 8. Accordingly, a mist of ink (liquid) is prevented from scattering to environs outside the liquid discharge apparatus 1 while the liquid discharge head discharges the ink to the recording medium (i.e., during liquid discharge operation). Further, the liquid discharge units 9A and 9B may include a fan to circulate airflow in the front cover 7 or the rear cover 8 to collect the generated mist of the ink (i.e., ink mist) in the front cover 7 or the rear cover 8.

The liquid discharge apparatus 1 according to the present embodiment includes the two liquid discharge units 9A and 9B arranged side by side in the X directions. The liquid discharge unit 9A discharges color ink and white ink. The liquid discharge unit 9B discharges a pretreatment liquid. The liquid discharged by each of the liquid discharge units 9A and 9B is not limited to the above example, and any liquid of the color ink, the white ink, and the pretreatment liquid may be discharged by each of the liquid discharge units 9A and 9B. In particular, when the recording medium is a fabric, the pretreatment liquid is preferably applied to the recording medium before the image formation using the ink. In other words, one of the liquid discharge units 9A and 9B preferably discharges the pretreatment liquid.

Since the liquid discharge units 9A and 9B have similar configurations, the liquid discharge unit 9A is described below. The liquid discharge unit 9A includes a carriage 10A, a guide rod 11, and an electrical component unit 12 including, for example, a board and an electrical component cover. A position facing the carriage 10A or a carriage 10B in the X directions is referred to as a liquid discharge position where the liquid is discharged onto the recording medium on the platen 3. The liquid discharge units 9A and 9B and the carriages 10A and 10B are also referred to simply as a liquid discharge unit 9 and a carriage 10, respectively, unless distinguished.

The guide rod 11 extends in the main scanning direction. The carriage 10 is movable in the main scanning direction along the guide rod 11. The carriage 10 includes multiple liquid discharge heads.

The process of forming an image on the recording medium by the liquid discharge head is described below.

The recording medium is placed on the platen 3 and conveyed along the guide rail 4. The recording medium is conveyed to a rear side of the liquid discharge apparatus 1, and the pretreatment liquid is applied to the recording medium by the liquid discharge unit 9B. Specifically, while the carriage 10B moves in the main scanning direction along the guide rod 11, the liquid discharge unit 9B discharges the pretreatment liquid from the nozzles of the liquid discharge head to apply the pretreatment liquid to the entire width of the recording medium in the main scanning direction. The application of the pretreatment liquid is repeated at multiple positions in the sub-scanning direction. Thus, the pretreatment liquid is applied to the entire recording medium. After that, the platen 3 moves forward, and the liquid discharge unit 9A discharges the color ink of multiple colors onto the recording medium using a method similar to that of the liquid discharge unit 9B. When white color is printed on the recording medium, for example, the liquid discharge unit 9A discharges the white ink onto the recording medium, the platen 3 moves to the rear side of the liquid discharge unit 9A again, and the liquid discharge unit 9A discharges the color ink onto the recording medium. Thus, an image is formed on the recording medium.

Figure 5:
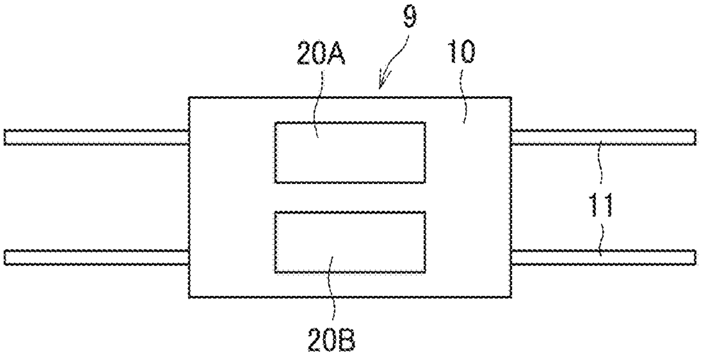
FIG. 5 is a plan view of a liquid discharge unit including two liquid discharge heads mounted on one carriage, according to an embodiment of the present disclosure.

As illustrated in FIG. 5, the carriage 10 may include multiple liquid discharge heads 20A and 20B. The multiple liquid discharge heads 20A and 20B may collectively be referred to as liquid discharge heads 20, each of which may referred to as a liquid discharge head 20 unless distinguished. In this case, for example, the pretreatment liquid is discharged by the liquid discharge head 20A, and the white or the color ink is discharged by the liquid discharge head 20B.

Figure 6:
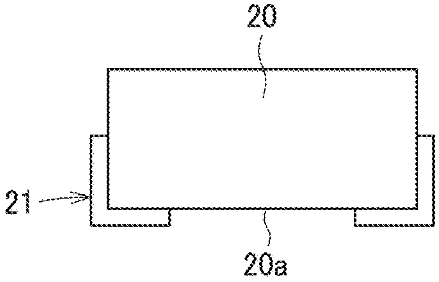
FIG. 6 is a side view of a liquid discharge head having a head cover according to an embodiment of the present disclosure.

As illustrated in FIG. 6, the liquid discharge head 20 according to the present embodiment includes a head cover 21 attached to the peripheral area of a nozzle face 20*a*. The head cover 21 is disposed around the entire nozzle face 20*a* (see FIG. 12). The nozzle face 20*a* is a surface of the liquid discharge head 20 facing the recording medium. An opening end of the nozzle is formed on the nozzle face 20*a*.

A head maintenance device according to an embodiment of the present disclosure is described below with reference to FIGS. 7 and 8. The head maintenance device maintains and recovers the state of the liquid discharge head 20 of the liquid discharge apparatus 1.

Figure 7:
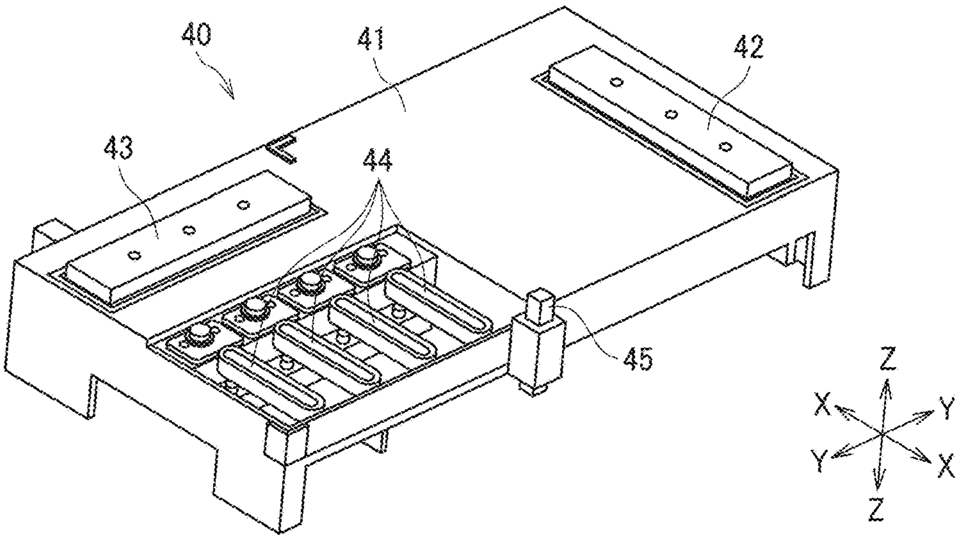
FIG. 7 is a perspective view of a wiping device according to an embodiment of the present disclosure.
Figure 8:
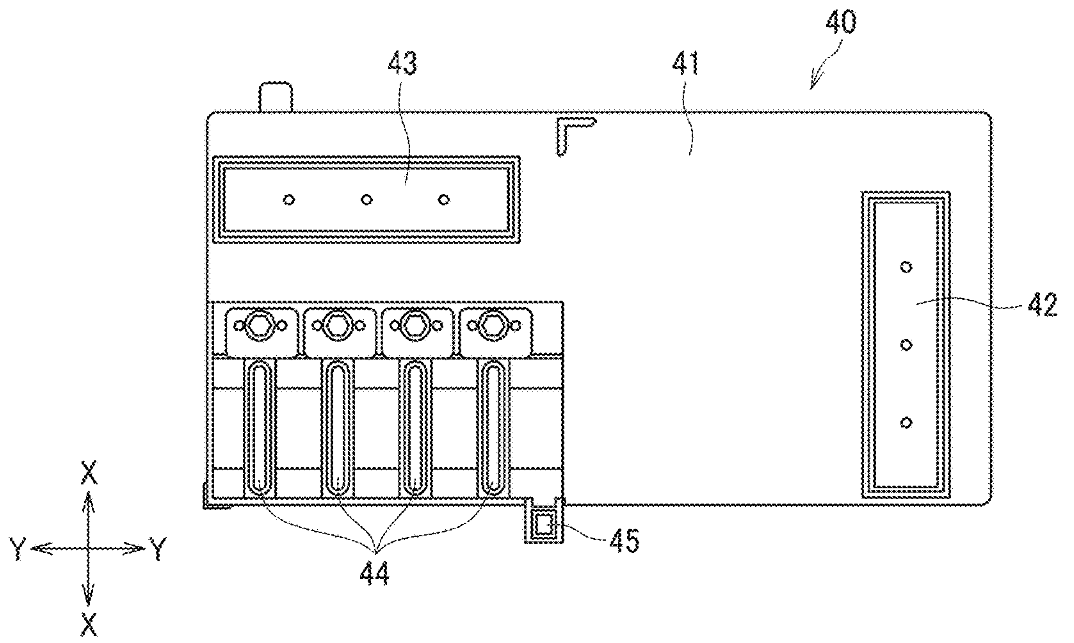
FIG. 8 is a plan view of the wiping device of FIG. 7.

As illustrated in FIGS. 7 and 8, a head maintenance device 40 includes a housing 41, a first absorber 42, a second absorber 43, and a cap 44. The X, Y, and Z directions illustrated in FIG. 7 indicate the orientation of the head maintenance device 40 attached to the liquid discharge apparatus 1 described above. The first absorber 42 and the second absorber 43 are non-windable wipers secured on the housing 41, and in the present embodiment, are sponges made of polyethylene. The first absorber 42 and the second absorber 43 may be made of urethane, but not limited thereto.

Bosses of the first absorber 42 and the second absorber 43 are fitted into holes of the housing 41. Alternatively, holes of the first absorber 42 and the second absorber 43 are fitted onto bosses of the housing 41. The first absorber 42 extends in the X directions, and the second absorber 43 extends in the Y directions. The first absorber 42 and the second absorber 43 move in the X directions or the Y directions relative to the liquid discharge head 20 while contacting the liquid discharge head 20 to wipe the liquid discharge head 20. The first absorber 42 and the second absorber 43 are replaced with new ones at an appropriate point in time because the wiping performance of the first absorber 42 and the second absorber 43 deteriorates due to repeated use. At this time, the fitting of the first absorber 42 and the second absorber 43 to the housing 41 by the bosses and the holes facilitates the replacement of the first absorber 42 and the second absorber 43.

The cap 44 is open upward in FIG. 7 and can cover and seal the nozzle face 20*a* of the liquid discharge head 20. The cap 44 filled with a cleaning liquid is kept covering the nozzle face 20*a* for a predetermined length of time to dissolve the thickened ink in the nozzle of the liquid discharge head 20. Thus, the clogging of the nozzle can be eliminated. Further, the cap 44 retains the moisture inside the nozzle. The same number of caps 44 are preferably provided for the liquid discharge heads 20 mounted on the carriage 10, but the cap 44 may move multiple times to cover all of the liquid discharge heads 20. In FIG. 7, multiple caps 44 are arrayed in the Y directions, and each of the multiple caps 44 extends in the X directions.

As illustrated in FIG. 8, the multiple caps 44 and the second absorber 43 are arranged along the transverse side of the housing 41 in the transverse direction, which is the movement direction of the housing 41 relative to the nozzle face 20*a* of the liquid discharge head 20 by the stage 13 (i.e., the X directions). The second absorber 43 overlaps with the multiple caps (at least one of the multiple caps 44) in the Y directions. Accordingly, the multiple caps 44 can cover the nozzles arrayed on the nozzle face 20*a* immediately after the second absorber 43 wipes the nozzle face 20*a*, or the second absorber 43 can wipe the nozzle face 20*a* immediately after the the multiple caps 44 separate the nozzle face 20*a*.

The multiple caps 44 are disposed at one end of the longitudinal side of the housing 41 in the Y directions, and the first absorber 42 is disposed at the other end of the longitudinal side of the housing 41 in the Y directions. The longitudinal side of the housing 41 is parallel to the second absorber 43. Thus, the first absorber 42, the second absorber 43, and the multiple caps 44 can be compactly arranged in the housing 41.

The head maintenance device 40 attached to the liquid discharge apparatus 1 is described below with reference to FIGS. 9 and 10.

Figure 9:
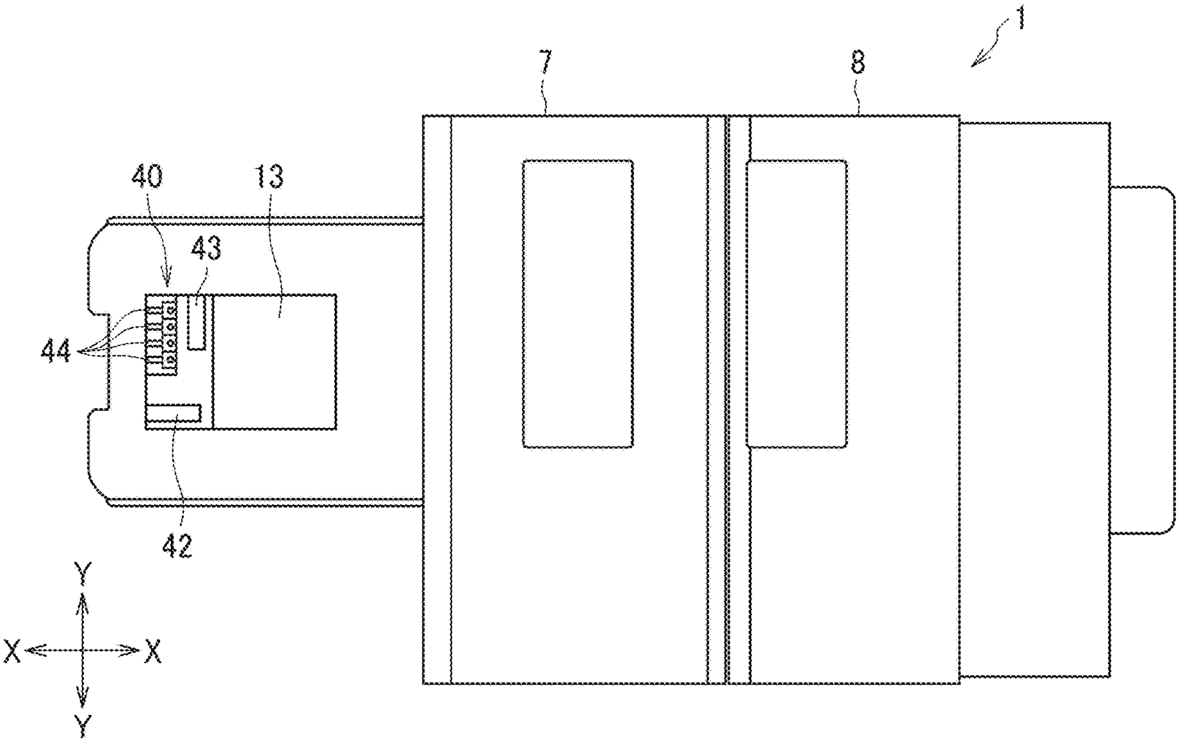
FIG. 9 is a plan view of a liquid discharge apparatus to which the wiping device of FIG. 7 is attached, according to an embodiment of the present disclosure.
Figure 10:
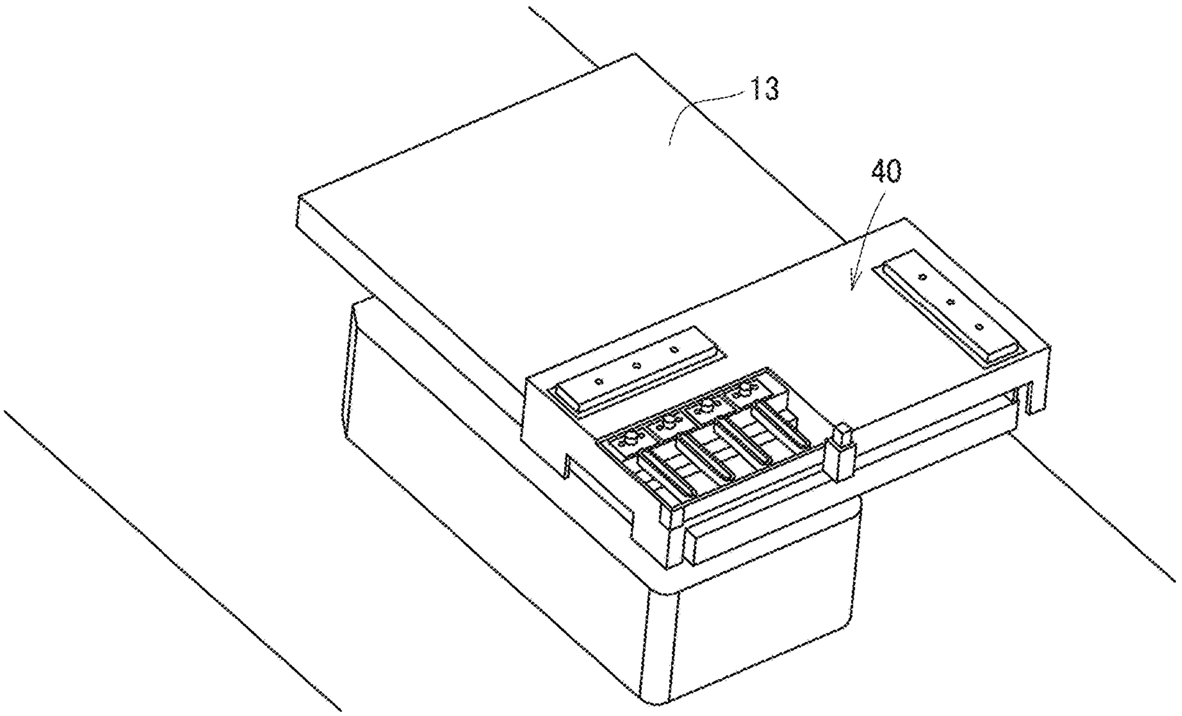
FIG. 10 is a perspective view of the wiping device of FIG. 7 attached to a liquid discharge apparatus according to an embodiment of the present disclosure.

As illustrated in FIGS. 9 and 10, the head maintenance device 40 according to the present embodiment is attached onto the stage 13 instead of the platen 3 (see FIG. 1). The stage 13 moves on the guide rail 4 to move the head maintenance device 40 to the liquid discharge position of each of the liquid discharge heads 20A and 20B. The stage 13 moves up and down to adjust the relative positions of the liquid discharge head 20 and the head maintenance device 40 in the vertical direction.

Figure 11:
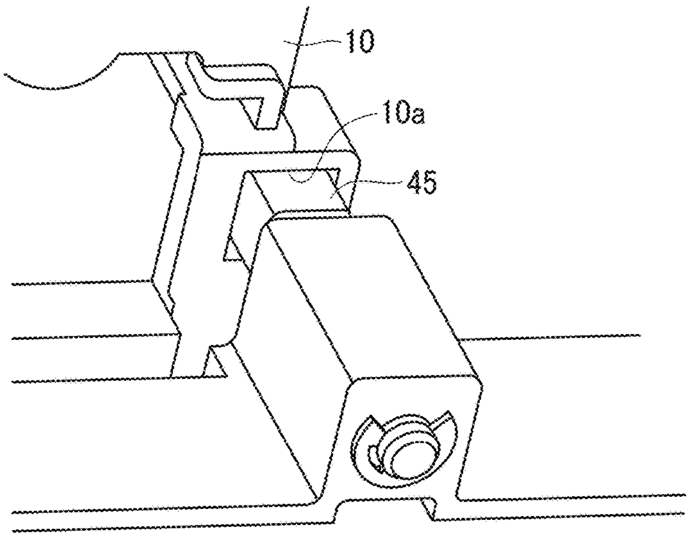
FIG. 11 is a perspective view of a positioning structure to position the wiping device of FIG. 7 relative to a carriage, according to an embodiment of the present disclosure.

The head maintenance device 40 includes a positioning pin 45 as a positioner illustrated in FIG. 7. As illustrated in FIG. 11, the positioning pin 45 is fitted into a fitting hole 10*a* on the bottom face of the carriage 10 to position the head maintenance device 40 relative to the carriage 10. Accordingly, the liquid discharge head 20 can be positioned relative to absorbers (e.g., a first absorber 42 and a second absorber 43) and caps (e.g., caps 44) of the head maintenance device 40. For example, when the liquid discharge apparatus 1 and the head maintenance device 40 are shipped from a factory, the positioning pin 45 is fitted into the fitting hole 10*a*, and the position of the head maintenance device 40 relative to the carriage 10 is stored in the liquid discharge apparatus 1. Accordingly, when the head maintenance device 40 is used after shipment, the head maintenance device 40 can be accurately positioned relative to the liquid discharge head 20. In particular, in the case of a large liquid discharge apparatus 1, the absolute value of the positional error between the liquid discharge head 20 and the head maintenance device 40 is likely to be large, but the configuration according to the present embodiment can position the head maintenance device 40 relative to the liquid discharge head 20 with high accuracy.

The first absorber 42 and the second absorber 43 wiping the liquid discharge head 20 are described below.

The stage 13 moves on the guide rail 4 (see FIG. 1), and the carriage 10 (see FIG. 4) moves in the main scanning direction to cause the head maintenance device 40 to face the carriage 10. Then, the stage 13 moves upward to bring the first absorber 42 or the second absorber 43 into contact with the liquid discharge head 20.

Figure 12A:
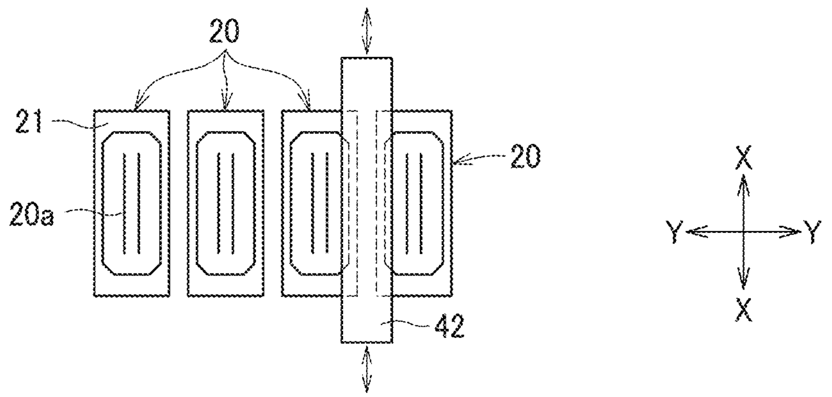
FIGS. 12A to 12C are diagrams each illustrating an absorber of the wiping device of FIG. 7 wiping a nozzle face and a head cover, according to an embodiment of the present disclosure.
Figure 12B:
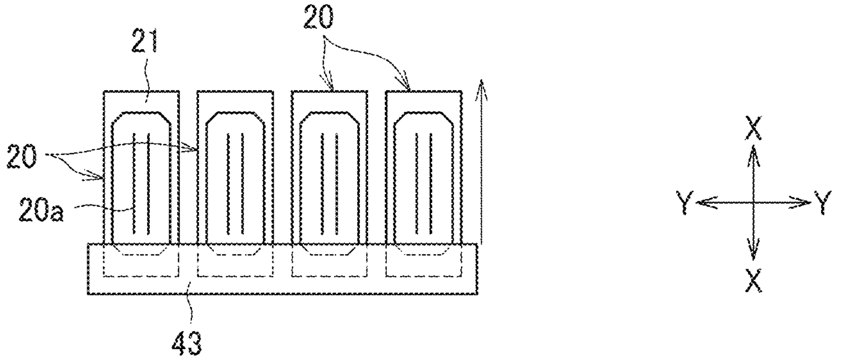
Figure 12C:
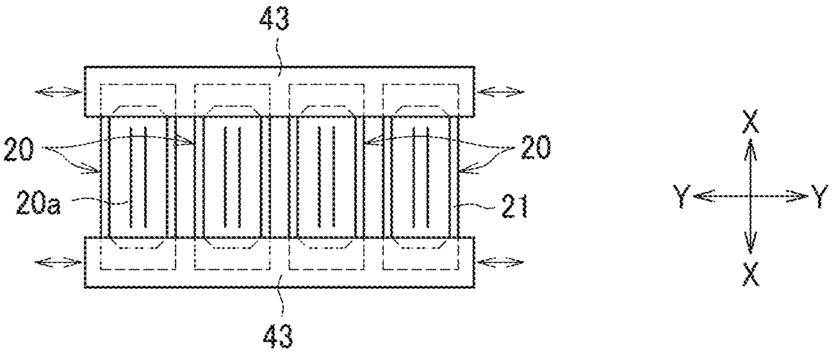

FIGS. 12A to 12C are diagrams each illustrating the liquid discharge head 20 which is wiped by the first absorber 42 or the second absorber 43 as viewed from the bottom face side of the carriage 10.

As illustrated in FIG. 12A, as the stage 13 reciprocally moves in the X directions, the first absorber 42 reciprocates in the X directions between the liquid discharge heads 20 while contacting the liquid discharge heads 20. Thus, the first absorber 42 can wipe the peripheral area of the head cover 21 extending in the X directions. The first absorber 42 reciprocates twice at five positions in total including three positions between the liquid discharge heads 20, the left side of the leftmost liquid discharge head 20 in FIG. 12A, and the right side of the rightmost liquid discharge head 20 in FIG. 12A. Thus, the first absorber 42 reciprocates ten times in total to wipe the peripheral area extending in the X directions of all the liquid discharge heads 20.

As illustrated in FIG. 12B, the second absorber 43 contacts one end of the liquid discharge heads 20 in the X directions. As the stage 13 moves, the second absorber 43 moves in one of the X directions while contacting the liquid discharge heads 20. Accordingly, the second absorber 43 can wipe the entire bottom faces of the liquid discharge heads 20 including the nozzle faces 20*a* of the liquid discharge heads 20 in one wiping.

Further, as illustrated in FIG. 12C, the second absorber 43 contacts one end or the other end of the liquid discharge heads 20 in the X directions. As the carriage 10 moves along the guide rod 11 (see FIG. 4), the second absorber 43 moves in the Y directions relative to the liquid discharge heads 20 while contacting the one end or the other end of the liquid discharge heads 20. Specifically, the second absorber 43 reciprocates in the Y directions four times at the one end or the other end of the liquid discharge heads 20 in the X directions. Thus, the second absorber 43 can wipe the peripheral area of the head cover 21 extending in the Y directions.

The liquid discharge heads 20 can be wiped by the first absorber 42 and the second absorber 43 by the above operations. The movement of the stage 13 in the X directions and the movement of the carriage 10 in the Y directions cause the first absorber 42 or the second absorber 43 to contact the liquid discharge heads 20 and reciprocally move relative to the liquid discharge heads 20 as described above.

The head maintenance device 40 is arranged at a predetermined position relative to the carriage 10 by the movement of the stage 13 or the movement of the carriage 10 so that the caps 44 (see FIG. 7) face the liquid discharge heads 20. Under these conditions, the stage 13 moves upward to cause the caps 44 to cover the nozzle faces 20*a* of the liquid discharge heads 20. Thus, the clogging of the nozzles of the liquid discharge head 20 can be eliminated as described above.

As described above, in the present embodiment, due to such a configuration in which the head maintenance device 40 is attached to the stage 13, a head maintenance device is not necessarily accommodated in the liquid discharge apparatus 1, so that the liquid discharge apparatus 1 can be downsized. The head maintenance device 40 can perform the wiping operation of the liquid discharge heads 20 and the capping operation with respect to the nozzle faces 20*a* of the liquid discharge heads 20. Accordingly, the nozzles of the liquid discharge head 20 can be maintained and recovered by one head maintenance device 40. In addition, due to such a configuration in which the head maintenance device 40 is attached to the stage 13, the wiping operation and the capping operation described above can be performed using the movement of the stage 13 in the X directions and the movement of the carriage 10 in the Y directions. Accordingly, the nozzles of the liquid discharge head 20 can be maintained and recovered without another driving mechanism.

A head maintenance device 40 according to a modification of the present embodiment is described below.

Figure 13:
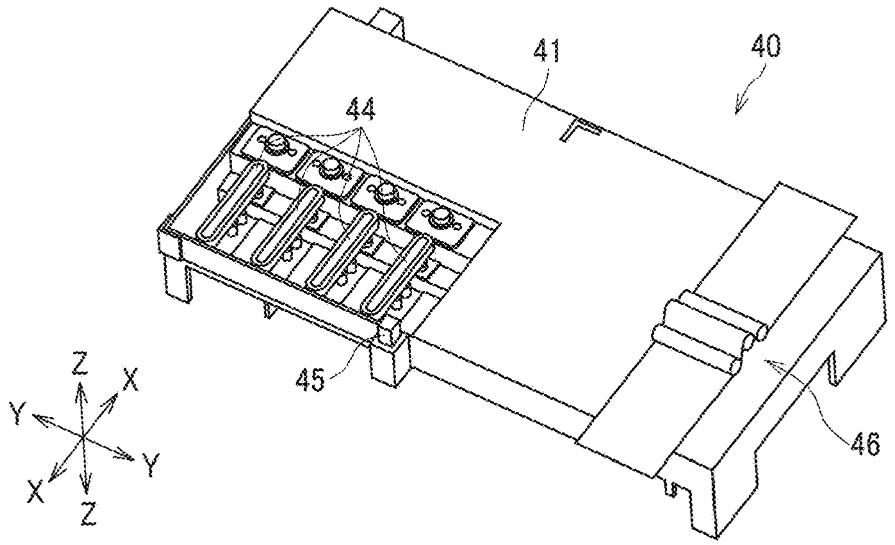
FIG. 13 is a perspective view of a wiping device according to another embodiment of the present disclosure.

The head maintenance device 40 illustrated in FIG. 13 is different in that a web unit 46 including a windable web 51 is provided instead of the above-described absorbers (e.g., the first absorber 42 and the second absorber 43).

Figure 14:
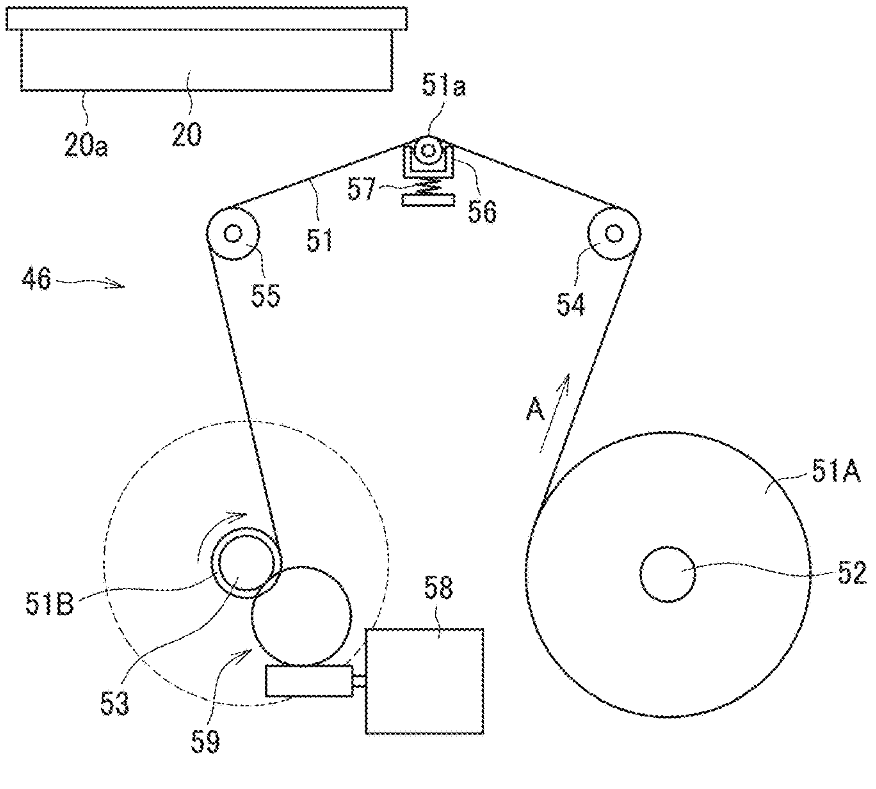
FIG. 14 is a side view of a web unit according to an embodiment of the present disclosure.
Figure 15:
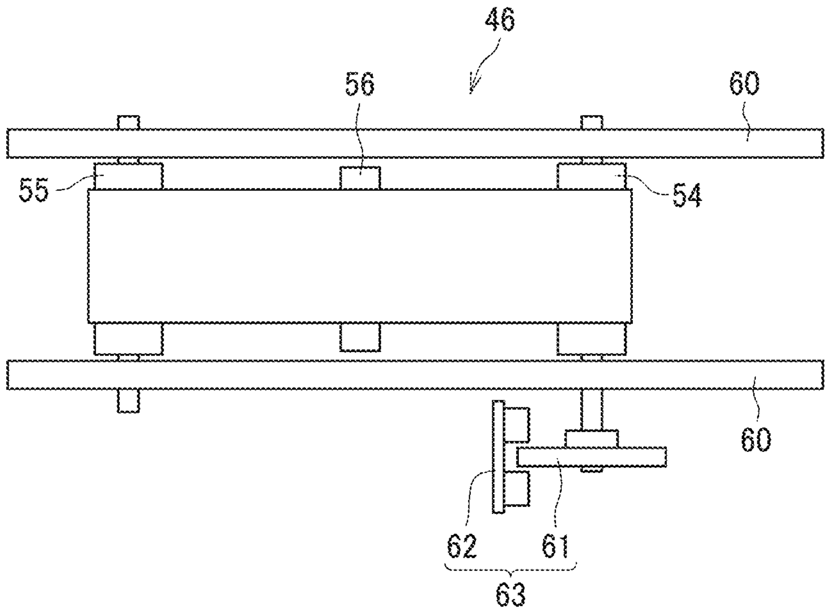
FIG. 15 is a plan view of the web unit of FIG. 14.

As illustrated in FIG. 14, the web unit 46 includes the web 51 as a wiper, a feed roller 52, a take-up roller 53, guide rollers 54 and 55, a pressing member 56, a spring 57, a drive motor 58, and a transmission mechanism 59. The web 51 is wound around the outer circumferential surface of the feed roller 52 to form a roll 51A of the web 51 to be fed. The web 51 is wound around the outer circumferential surface of the take-up roller 53 to form a roll 51B of the wound web 51. The web 51 is fed in the direction indicated by arrow A. In FIG. 14, the illustration of the head cover 21 of the liquid discharge head 20 is omitted. The feed roller 52, the take-up roller 53, and the guide rollers 54 and 55 are rotatably attached to side plates 60 (see FIG. 15) in the housing 41 (see FIG. 13) of the head maintenance device 40. The upper portion of the web unit 46 in FIG. 14 corresponds to the web unit 46 illustrated in FIG. 13, and the lower portion of the web unit 46 in FIG. 14 is accommodated in the housing 41 of the head maintenance device 40. In other words, the lower portion of the web unit 46 is covered by the housing 41 in FIG. 13.

The spring 57 presses the pressing member 56 between the guide rollers 54 and 55 to cause the pressing member 56 to press the web 51 against the nozzle face 20*a* to be wiped. The portion of the web 51 pressed against the nozzle face 20*a* by the pressing member 56 is a wiping portion 51*a* of the web 51.

Preferably, the web 51 is a sheet-shaped material that has absorbency and liquid resistance, at least, against the liquid to be used and does not cause fuzz and dust. Examples of such materials include, but are not limited to, nonwoven fabric, cloth, film, and paper.

The driving force of the drive motor 58 is transmitted to the take-up roller 53 via the transmission mechanism 59. The take-up roller 53 is rotated by the driving force of the drive motor 58 to wind and convey the web 51 in the direction indicated by arrow A.

A code wheel 61 is attached to the guide roller 54, and an encoder sensor 62 including a transmissive photosensor detects a pattern formed on the code wheel 61. The code wheel 61 and the encoder sensor 62 together serve as an encoder 63 that detects the distance of movement (feed amount) of the web 51. When the end state (i.e., depletion) of the web 51 is detected by the encoder 63 based on the feed amount, the web 51 is replaced with a new one.

Figure 16:
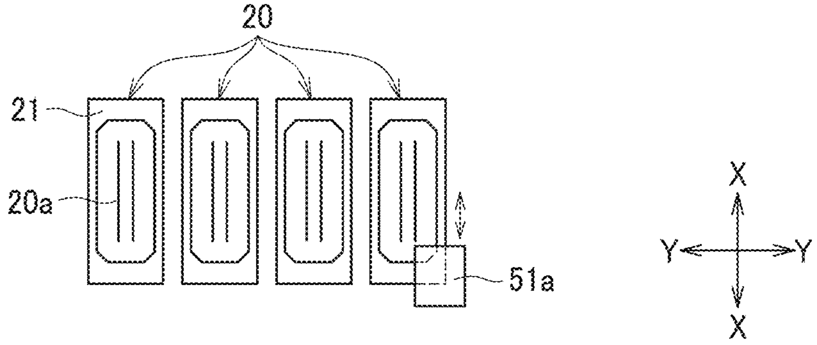
FIG. 16 is a diagram illustrating a web of the web unit of FIG. 14 wiping the nozzle face and the head cover, according to an embodiment of the present disclosure.

As illustrated in FIG. 16, the stage 13 reciprocally moves in the X directions at multiple positions in the Y directions while the wiping portion 51*a* of the web 51 is pressed against the liquid discharge head 20 to wipe the entire nozzle face 20*a* and the head cover 21. In addition, the caps 44 can perform the capping operation with respect to the nozzle face 20*a* of the liquid discharge head 20. As described above, the nozzles of the liquid discharge head 20 can be maintained and recovered by the head maintenance device 40 according to the present embodiment. Further, the web unit 46 may include an absorber in addition to the web 51.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

In the present disclosure, the liquid to be discharged is not limited to a particular liquid as long as the liquid has a viscosity or surface tension to be discharged from a head (liquid discharge head). However, preferably, the viscosity of the liquid is not greater than 30 millipascal-second (mPa·s) under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; and an edible material, such as a natural colorant. Such a solution, a suspension, or an emulsion can be used for, e.g., inkjet ink; surface treatment liquid; a liquid for forming an electronic element component, a light-emitting element component, or an electronic circuit resist pattern; or a material solution for three-dimensional fabrication.

The term "liquid" includes not only ink but also paint, a pretreatment liquid, a binder, and an overcoat liquid.

In the present disclosure, the term "liquid discharge apparatus" includes a carriage including a liquid discharge head and drives the liquid discharge head to discharge liquid. The term "liquid discharge apparatus" used in the present disclosure includes, in addition to apparatuses to discharge liquid to a recording medium serving as a medium onto which liquid can adhere, apparatuses to discharge the liquid into gas (air) or liquid.

For example, the "liquid discharge apparatus" may further include devices relating to feeding, conveying, and ejecting of the medium onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as characters or figures. For example, the liquid discharge apparatus may be an apparatus that forms patterns having no meaning or an apparatus that fabricates three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any material to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus in which the liquid discharge head and the medium onto which liquid can adhere move relative to each other. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

Aspects of the present disclosure are, for example, as follows.

Aspect 1

A head maintenance device includes a wiper to wipe a liquid discharge head, and a cap to cover a nozzle face. The nozzle face is a surface of the liquid discharge head and has an opening end of a nozzle. The head maintenance device is detachably attachable to a conveyor to convey a recording medium to a liquid discharge position.

In other words, a head maintenance device includes a housing, a wiper, and a cap. The housing is detachably attachable to a conveyor of the liquid discharge apparatus. The conveyor conveys a medium in one direction. The wiper is disposed in the housing to wipe a nozzle face of a liquid discharge head of the liquid discharge apparatus. The cap is disposed in the housing to cover nozzles arrayed on the nozzle face of the liquid discharge head in the one direction.

Aspect 2

In the head maintenance device according to Aspect 1, the wiper extends in another direction intersecting the one direction in the housing, and the cap extends in the one direction in the housing.

Aspect 3

In the head maintenance device according to Aspect 2, the wiper and the cap in the housing are along a moving direction of the housing relative to the nozzle face of the liquid discharge head.

Aspect 4

The head maintenance device according to Aspect 3, further includes multiple caps including the cap. The multiple caps are arrayed in said another direction, and the wiper overlaps with the multiple caps in said another direction.

Aspect 5

In the head maintenance device according to Aspect 2, the housing has a longitudinal side in said another direction parallel to the wiper.

Aspect 6

In the head maintenance device according to any one of Aspects 1 to 5, the wiper is a non-windable absorber.

In other words, the wiper includes an absorber secured on the housing.

Aspect 7

In the head maintenance device according to Aspect 6, the absorber has a hole, and the housing has a boss fittable into the hole.

Aspect 8

In the head maintenance device according to Aspect 6, the housing has a hole, and the absorber has a boss fittable into the hole.

Aspect 9

In the head maintenance device according to any one of Aspects 1 or 5, the wiper is windable.

In other words, the wiper includes windable web.

Aspect 10

The head maintenance device according to any one of Aspects 1 to 9, further includes a positioner that can be positioned relative to a carriage including the liquid discharge head.

In other words, the head maintenance device according to any one of Aspects 1 to 9, further includes a positioner to position the housing relative to a carriage mounting the liquid discharge head.

Aspect 11

The head maintenance device according to Aspect 2, further includes another wiper extending in the one direction in the housing. The housing has a longitudinal side in said another direction parallel to the wiper. The cap is disposed at one end of the longitudinal side of the housing, and said another wiper is disposed at another end of the longitudinal side of the housing.

Aspect 12

A liquid discharge apparatus includes the head maintenance device according to any one of Aspects 1 to 11, the liquid discharge head, and the conveyor.

In other words, a liquid discharge apparatus includes the head maintenance device according to any one of Aspects 1 to 11, the liquid discharge head to discharge a liquid onto the medium, and the conveyor to convey the medium to the liquid discharge head.

As described above, according to one aspect of the present disclosure, the state of the nozzle of the liquid discharge head can be maintained and recovered.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A head maintenance device comprising:

a housing detachably attachable to a conveyor of a liquid discharge apparatus, the conveyor to convey a medium in one direction;

a wiper in the housing to wipe a nozzle face of a liquid discharge head of the liquid discharge apparatus; and multiple caps in the housing to cover nozzles arrayed on the nozzle face of the liquid discharge head in the one direction, wherein:

the wiper extends in another direction intersecting the one direction in the housing, the multiple caps extend in the one direction in the housing, the wiper and the cap in the housing are along a moving direction of the housing relative to the nozzle face of the liquid discharge head, the multiple caps are arrayed in said another direction, and the wiper overlaps with the multiple caps in said another direction.

2. The head maintenance device according to claim 1, wherein:

the housing has a longitudinal side in said another direction parallel to the wiper.

3. The head maintenance device according to claim 1, wherein:

the wiper includes an absorber secured on the housing.

4. The head maintenance device according to claim 3, wherein:

the absorber includes a hole, and the housing includes a boss fittable into the hole.

5. The head maintenance device according to claim 3, wherein;

the housing includes a hole, and the absorber includes a boss fittable into the hole.

6. The head maintenance device according to claim 3, wherein:

the absorber is a sponge including polyethylene or urethane.

7. The head maintenance device according to claim 1, wherein;

the wiper includes windable web.

8. The head maintenance device according to claim 1, further comprising:

a positioner to position the housing relative to a carriage mounting the liquid discharge head.

9. The head maintenance device according to claim 1, further comprising:

another wiper extending in the one direction in the housing, wherein:

the housing has a longitudinal side in said another direction parallel to the wiper, the multiple caps are at one end of the longitudinal side of the housing, and said another wiper is at another end of the longitudinal side of the housing.

10. A liquid discharge apparatus comprising:

the head maintenance device according to claim 1;

the liquid discharge head to discharge a liquid onto the medium; and the conveyor to convey the medium to the liquid discharge head.

11. The head maintenance device according to claim 1, wherein:

the housing includes a front cover and a rear cover that are slidable in the one direction relative to an apparatus body.

12. The head maintenance device according to claim 1, wherein:

the housing includes a fan to circulate airflow within the housing to collect a mist of the liquid.

13. The head maintenance device according to claim 1, wherein:

each of the multiple caps is filled with a cleaning liquid to dissolve thickened liquid in the nozzles.

14. The head maintenance device according to claim 1, wherein:

the wiper is a windable web comprising a sheet-shaped material selected from the group consisting of nonwoven fabric, cloth, film, and paper.

15. The head maintenance device according to claim 14, further comprising:

a drive motor, a take-up roller, and a transmission to rotate the take-up roller to wind the windable web.

16. The head maintenance device according to claim 15, further comprising:

an encoder including a code wheel and an encoder sensor to detect a feed amount of the windable web.

17. The head maintenance device according to claim 1, further comprising:

an apparatus body; and a control panel disposed on a front face of the apparatus body.

18. The head maintenance device according to claim 1, wherein:

the conveyor comprises a stage mounted on a guide rail, and the housing is attached to the stage.

19. A head maintenance device comprising:

a housing detachably attachable to a conveyor of a liquid discharge apparatus, the conveyor to convey a medium in one direction;

a wiper in the housing to wipe a nozzle face of a liquid discharge head of the liquid discharge apparatus; and a cap in the housing to cover nozzles arrayed on the nozzle face of the liquid discharge head in the one direction, wherein:

the wiper includes an absorber secured on the housing, the absorber includes a hole, and the housing includes a boss fittable into the hole.

20. A head maintenance device comprising:

a housing detachably attachable to a conveyor of a liquid discharge apparatus, the conveyor to convey a medium in one direction;

a wiper in the housing to wipe a nozzle face of a liquid discharge head of the liquid discharge apparatus; and a cap in the housing to cover nozzles arrayed on the nozzle face of the liquid discharge head in the one direction, wherein:

the wiper extends in another direction intersecting the one direction in the housing, the cap extends in the one direction in the housing, the head maintenance device further comprises another wiper extending in the one direction in the housing, the housing has a longitudinal side in said another direction parallel to the wiper, the cap is at one end of the longitudinal side of the housing, and said another wiper is at another end of the longitudinal side of the housing.

* * * * *